Feb. 16, 1932.  R. F. WALTERS  1,845,991
SNAP FASTENER SECURED TRIM STRIP INSTALLATION
Filed Sept. 20, 1930
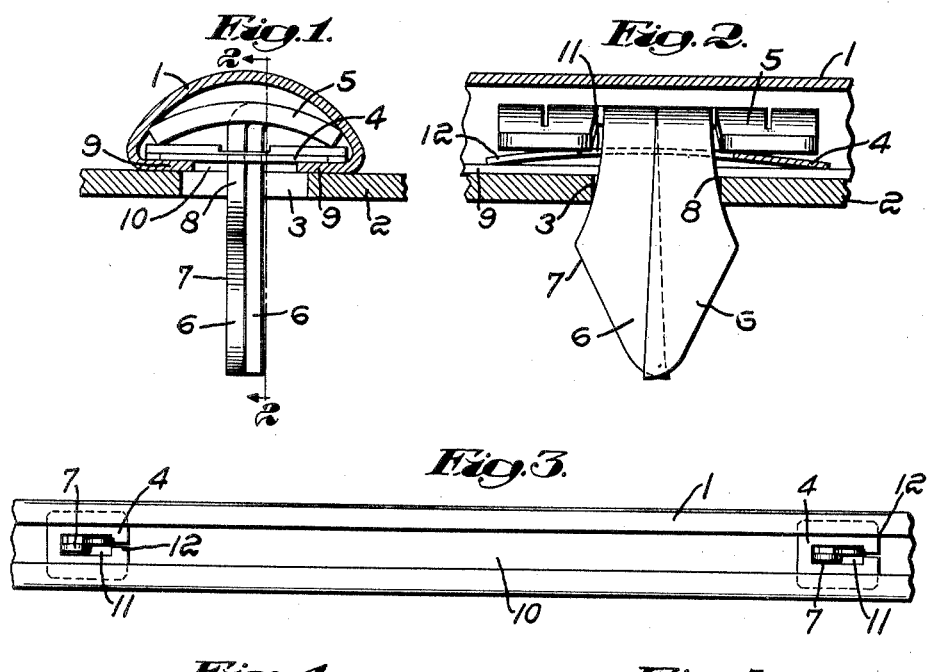
Inventor:
Rollo F. Walters,
by Emery, Booth, Varney & Townsend
Attys Patented Feb. 16, 1932

1,845,991

UNITED STATES PATENT OFFICE

ROLLO F. WALTERS, OF DETROIT, MICHIGAN, ASSIGNOR TO UNITED-CARR FASTENER CORPORATION, OF CAMBRIDGE, MASSACHUSETTS, A CORPORATION OF MASSACHUSETTS

SNAP FASTENER SECURED TRIM STRIP INSTALLATION

Application filed September 20, 1930. Serial No. 483,224.

My invention aims to provide improvements in snap fastener secured trim strip installations.

In the drawings which illustrate a preferred embodiment of my invention:—

Figure 1 is a cross-sectional view through a trim strip and a part to which the trim strip is secured, the fastening means carried by the trim strip being shown in elevation;

Fig. 2 is a section on the line 2—2 of Figure 1, the fastener part being shown in elevation;

Fig. 3 is an under-side elevational view of a trim strip;

Fig. 4 is a plan view of the snap fastener stud carried by the trim strip; and

Fig. 5 is a view of the snap fastener stud taken from the opposite direction to that shown in Fig. 4.

Referring to the particular embodiment of my invention illustrated by the drawings, I have shown an installation which includes a hollow sheet metal trim strip 1 attached to a supporting structure 2 by means of separable snap fastener elements carried partly by the trim strip 1 and partly by the supporting structure 2.

The particular snap fastening means illustrated by the drawings comprises an aperture 3 formed in the supporting structure 2 to provide the socket means of a snap fastener and a snap fastener stud shiftably attached to the trim strip 1 and held in any given position by means of a spring member 4. The stud member may be of any suitable construction, but I have found that a sheet metal stud having a curved base 5, Fig. 1, in combination with a pair of projections 6—6 providing a head 7 and a neck 8, is best suited for the particular invention which I wish to cover by Letters Patent. The base 5 of the stud is rectangular in outline and is slid into the end of the trim strip in such a manner that the projections 6—6 extend beyond the inner face of the trim strip 1, which inner face is provided by inwardly bent flanges 9—9 terminating in spaced relation to provide a slot 10 through which the head and neck of the stud may project, as clearly shown in Figs. 1 and 3.

The apertures 3 provided in the supporting structure 2 may be spaced apart as desired and, therefore, in order that the fastener studs may be aligned with the apertures 3, they are permitted to be shifted lengthwise of the trim strip 1, because of the slot 10. The alignment and positioning of the studs with relation to the spacing of the apertures 3 in the supporting structure 2 must be made before attachment of the strip 1 and, therefore, it is essential that the studs be held against accidental shifting movement once they are properly spaced with relation to the trim strip 1.

In the particular structure illustrated by the drawings the studs are held against accidental movement with relation to the strip 1 by means of the spring members 4 which are in the form of thin sheet metal members curved in cross-section in a lengthwise direction with relation to the strip 1 and apertured to permit passage of the projections 6—6 of the stud member. Thus, the spring plates 4 are located in each instance between the base 5 of a stud member and the flanges 9—9 of the trim strip 1, thereby to press the base against the inner curved surface of the trim strip 1, Figs. 1 and 2. In this manner the stud members are held in any given positions by friction between the bases of the studs and the trim strip, which friction is created by means of the spring plates 4. Each spring plate is divided at one side of the aperture 11 by a slit 12 thereby to increase the resiliency of the plate, as will be well understood by those skilled in the art.

When the trim strip 1 is attached to the supporting structure 2, as illustrated in Figs. 1 and 2, the spring plates 4 cooperate with the elements of the installation to prevent rattle or shifting of the trim strip relative to the supporting structure. This action is effected because of the arrangement of the parts whereby the wedging action of the neck 8 of the stud against the wall surrounding the aperture 3 tends to pull the base 5 of the stud toward the supporting structure 2. Therefore, this pulling action is exerted against the spring member 4 which is slightly compressed, thereby pressing the flanges 9—9 of the trim strip tightly against the face of the supporting structure 2.

The installation which is illustrated in the drawings is an example of the application of my invention to an automobile body structure wherein the part 2 may be considered as the sheet metal side of the body proper and the part 1 the beading or trimming which divides one portion of the body from another portion. The type of snap fastening means illustrated is particularly adapted for this type of work because it is simple, durable and compact. Furthermore, the sheet metal type of spring 4 is particularly adapted to the combination because it requires very little space and is exceedingly efficient.

By splitting the spring plate 4 at one end it is increased slightly in width and thereby frictionally contacts with the beading along its edges to aid in holding the stud in a given position.

While I have illustrated and described the preferred embodiment of my invention, I do not wish to be limited to the particular details thereof, because the scope of my invention is best defined by the following claims.

Claims:

1. A snap fastener secured installation comprising, in combination, a supporting structure having an aperture, a hollow trimming strip, snap fastener members assembled with said strip and each having a base located within said trimming strip and arranged to slide longitudinally within said strip for relative adjustment, said fastener members each having a head extending beyond one face of the trimming strip and passing through the aperture in the supporting structure, thereby to secure the trimming strip to said supporting structure, and spring means interposed between the base of each fastener member and said trimming strip to prevent rattle of the parts of the installation.

2. A trim strip structure comprising, in combination, a hollow metal strip, a snap fastener member carried by said strip and having a smooth base located within said strip, said strip presenting a smooth inner surface to permit sliding of the fastener member, a spring member interposed between said base and said strip to prevent rattle and hold the fastener member against accidental movement relative to the strip, said snap fastener member having a head extending from said base through an aperture at the inner face of said strip for securing said strip to a support and means providing a lost motion connection between the fastener, spring and the strip whereby the fastener may be shifted by a lateral movement only relative to the strip for alignment with cooperating fastening means carried by a supporting structure.

3. A trim strip structure comprising, in combination, a hollow metal strip, a snap fastener member carried by said strip and having a base located within said strip, a spring member interposed between said base and said strip to prevent rattle and hold the fastener member against accidental movement relative to the strip and said snap fastener member having shank means passing through the spring member and the inner face of said strip and having a head and a neck for engagement with a socket on a supporting structure.

4. A trim strip structure comprising, in combination, a hollow metal strip, a snap fastener member carried by said strip and having a base located within said strip, a thin apertured sheet metal spring member interposed between said base and said strip to prevent rattle and hold the fastener member against accidental movement relative to the strip and said snap fastener member having shank means passing through the spring member and the inner face of said strip and having a head and a neck for engagement with a socket on a supporting structure.

5. A trim strip structure comprising, in combination, a hollow metal strip, a snap fastener member carried by said strip and having a base located within said strip, a thin apertured sheet metal spring member interposed between said base and said strip to prevent rattle and hold the fastener member against accidental movement relative to the strip and said snap fastener member having shank means passing through the spring member and the inner face of said strip and having a head and a neck for engagement with a socket on a supporting structure, said spring member having a slit at one end and said spring member being wider at the split end to provide for yielding edge contact between the strip and the spring member thereby to aid in holding the stud in a given position with relation to the strip.

6. A trim strip structure comprising, in combination, a hollow metal strip, a snap fastening member carried by said strip and having a base located within said strip, a thin apertured sheet metal spring member interposed between said base and said strip to prevent rattle and hold the fastener member against accidental movement relative to the strip, said snap fastener member being formed from sheet metal and having a pair of thin flat socket-engaging portions extending from said base through the spring member and the inner face of said strip, said socket-engaging portions being offset laterally relative to each other and being movable toward and away from each other for engagement with a socket provided on a supporting structure to which the strip is to be attached.

In testimony whereof, I have signed my name to this specification.

ROLLO F. WALTERS.

DISCLAIMER 1,845,991.—*Rollo F. Walters*, Detroit, Mich. SNAP FASTENER SECURED TRIM STRIP INSTALLATION. Patent dated February 16, 1932. Disclaimer filed August 20, 1932, by the assignee, *United-Carr Fastener Corporation*.

Hereby enters this disclaimer to that part of the claim in said specification which is in the following words, to wit:

"1. A snap fastener secured installation comprising, in combination, a supporting structure having an aperture, a hollow trimming strip, snap fastener members assembled with said strip and each having a base located within said trimming strip and arranged to slide longitudinally within said strip for relative adjustment, said fastener members each having a head extending beyond one face of the trimming strip and passing through the aperture in the supporting structure, thereby to secure the trimming strip to said supporting structure, and spring means interposed between the base of each fastener member and said trimming strip to prevent rattle of the parts of the installation.

"2. A trim strip structure comprising, in combination, a hollow metal strip, a snap fastener member carried by said strip and having a smooth base located within said strip, said strip presenting a smooth inner surface to permit sliding of the fastener member, a spring member interposed between said base and said strip to prevent rattle and hold the fastener member against accidental movement relative to the strip, said snap fastener member having a head extending from said base through an aperture at the inner face of said strip for securing said strip to a support and means providing a lost motion connection between the fastener, spring and the strip whereby the fastener may be shifted by a lateral movement only relative to the strip for alignment with cooperating fastening means carried by a supporting structure.

"3. A trim strip structure comprising, in combination a hollow metal strip, a snap fastener member carried by said strip and having a base located within said strip, a spring member interposed between said base and said strip to prevent rattle and hold the fastener member against accidental movement relative to the strip and said snap fastener member having shank means passing through the spring member and the inner face of said strip and having a head and a neck for engagement with a socket on a supporting structure.

"4. A trim strip structure comprising, in combination, a hollow metal strip, a snap fastener member carried by said strip and having a base located within said strip, a thin apertured sheet metal spring member interposed between said base and said strip to prevent rattle and hold the fastener member against accidental movement relative to the strip and said snap fastener member having shank means passing through the spring member and the inner face of said strip and having a head and a neck for engagement with a socket on a supporting structure."

"6. A trim strip structure comprising, in combination, a hollow metal strip, a snap fastening member carried by said strip and having a base located within said strip, a thin apertured sheet metal spring member interposed between said base and said strip to prevent rattle and hold the fastener member against accidental movement relative to the strip, said snap fastener member being formed from sheet metal and having a pair of thin flat socket-engaging portions extending from said base through the spring member and the inner face of said strip, said socket-engaging portions being offset laterally relative to each other and being movable toward and away from each other for engagement with a socket provided on a supporting structure to which the strip is to be attached."

[*Official Gazette September 6, 1932.*]